UNITED STATES PATENT OFFICE.

THOMAS B. ALLEN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

METHOD OF BONDING FUSED CRYSTALLINE ALUMINA.

1,107,011.  Specification of Letters Patent.  Patented Aug. 11, 1914.

No Drawing.  Application filed March 11, 1913.  Serial No. 753,648.

*To all whom it may concern:*

Be it known that I, THOMAS B. ALLEN, a subject of the King of Great Britain, residing at Niagara Falls, Niagara county, New York, have invented a new and useful Method of Bonding Fused Crystalline Alumina, of which the following is a full, clear, and exact description.

My invention relates to the manufacture of refractory articles formed of grains of fused crystalline alumina held together by a binder.

The object of the invention is to provide a simple and efficient process for this purpose, which may be used at temperatures below those where alumina softens.

My method consists in forming on the surface of the grain and partly from its substance a highly refractory aluminum compound, such as aluminum borate or aluminum borid.

In carrying out my invention I preferably mix the grains of alumina intimately with a small quantity of a solution of boric acid and glycerin. The quantity of this solution need not exceed five per cent. of the total mix, and is preferably prepared by heating about eighty parts of glycerin and dissolving therein about twenty parts of finely powdered boric acid. This mixture of alumina grains, boric acid and glycerin, which is preferably about the constituency of molding sand, is then molded into the desired shape in any suitable way, as by pressing or tamping. The articles thus formed are then fired in a pottery kiln to a temperature of about 1350 degrees or above. During this firing some of the boric acid is lost by volatilization, but a portion combines with the surface of the grains, bonding them together very firmly but still leaving the article very porous. This article is substantially as refractory in character as if composed of alumina alone.

The advantages of my invention will be apparent to those skilled in the art, since the process can be carried out at ordinary kiln temperatures, and does not require the higher range of temperatures near the softening point of alumina. The articles have great tensile strength, and are substantially as refractory as the fused alumina of which they are composed. They are also very porous, being capable of absorbing about 18 per cent. of their own weight of water. The glycerin solution is of especial advantage in obtaining the bonding action at the desired temperature; for I find that aqueous solutions of boric acid do not exert this bonding action at temperatures commonly obtained in pottery kilns. I have also been unable to bond articles by mixing powdered boric acid and water with the alumina and heating to a temperature of 1350 degrees C. The glycerin solution of other acids may be used, such as that of phosphoric acid. This gives a satisfactory bond, but not quite as strong as the boric acid bond. The solution of boric acid and glycerin prepared as herein described forms a product known chemically as glycero-boric acid. The method may also be applied to the making of articles of fuzed alumina for abrasive, mechanical, electrical, and other purposes. Alumina grains of any degree of fineness may be used, from No. 16 mesh down to the finest powders. I have found that for general refractory purposes grains sized to 150 mesh will give a strong and durable article when treated by my process.

By the words " consisting essentially of " in my claims, I mean that at least the major part of the article is alumina.

I claim:

1. The method of bonding molded articles consisting essentially of alumina, which consists in molding a mixture of alumina and a glycerin solution of an acid, the acid radical of which is capable of uniting with alumina, and heating the article to a temperature where such reaction will take place.

2. The method of bonding molded articles consisting essentially of alumina, which consists in molding a mixture of alumina and a glycerin solution of an acid, the acid radical of which is capable of uniting with alumina, and heating the article to a temperature of at least 1300 degrees C. or above.

3. The method of bonding molded articles consisting essentially of alumina, which consists in molding a mixture of alumina, boric acid and glycerin, and firing the articles to a temperature sufficient to cause the boric acid to combine with the alumina and bond the article.

4. The method of bonding molded articles consisting essentially of alumina grains, which consists in mixing the grains with a binder capable of forming an aluminum compound with the grains at a temperature below the softening heat of alumina, and then heating the mixture to said reaction temperature.

In testimony whereof, I have hereunto set my hand.

THOS. B. ALLEN.

Witnesses:
ARTHUR BATTS,
J. M. MANLEY.